UNITED STATES PATENT OFFICE.

WILHELM MAJERT, OF BERLIN, GERMANY.

PROCESS OF MAKING PIPERAZINE.

SPECIFICATION forming part of Letters Patent No. 509,087, dated November 21, 1893.

Application filed September 28, 1891. Serial No. 406,987. (Specimens.) Patented in Luxemburg July 14, 1891, No. 1,475.

*To all whom it may concern:*

Be it known that I, WILHELM MAJERT, doctor of philosophy, a subject of the King of Prussia, residing at 10 Madaistrasse, Berlin, Germany, have invented certain new and useful Improvements in and Relating to the Manufacture of Piperazine, (for which I have obtained a patent in Luxemburg, No. 1,475, dated July 14, 1891;) and I do hereby declare the following to be a full, clear, and exact description of the invention, such as will enable others skilled in the art to which it appertains to make and use the same.

The invention relates to the production of piperazin, and consists in a novel process of obtaining this chemical, as will now be fully described.

In the specification forming part of Letters Patent of the United States granted to me March 22, 1892, No. 471,520, I have described a process for obtaining piperazin from certain of its compounds. I have since discovered that the di, tri and tetra-sulphoacids of diphenyl-piperazin or ditolyl-piperazin, as for instance diphenylpiperazindisulphoacid, diphenylpiperazintrisulphoacid, diphenylpiperazintetrasulphoacid, orthoditolylpiperazindisulphoacid, orthoditolylpiperazintrisulphoacid, orthoditolylpiperazintetrasulphoacid, paraditolylpiperazindisulphoacid, paraditolylpiperazintrisulphoacid, paraditolylpiperazintetrasulphoacid, may be employed with the very best results in the production of piperazin when these bodies are treated with alkalies as soda or potash, or with alkaline earths, as lime, baryta, strontia, or magnesia, as hereinafter set forth.

The sulphoacids above referred to which may also be employed with particular advantage in the form of alkali salts (soda or potash salts) are mixed with four times their volume or quantity of water, and heated, preferably in a closed still or retort provided with suitable agitating devices and means for collecting the distillate, whereby piperazin is formed and is distilled or passes over with the steam. The process of distillation is continued so long as the distillate shows an alkaline reaction. The distillate containing the piperazin and collected in the receiver, is then treated with a suitable acid, as for instance, hydrochloric acid or sulphuric acid or phosphoric acid, until the piperazin is neutralized and is then crystallized by evaporation. The piperazin base may now be obtained from the piperazin salt, obtained as described, by mixing sodium or potassium hydrate or carbonate with a concentrated aqueous solution of the piperazin salt and distilling the same, the distillate congealing in the collector into a crystalline mass composed of piperazin, which may be freed from moisture in any well known manner.

In the treatment of the sulphoacids or their corresponding sulphoacid salts above described, the alkali or alkalies may be replaced in whole or in part by an alkaline earth, such as lime, baryta, strontia or magnesia, or a mixture of these, and their proportions relatively to the sulphoacid may be varied without departing from the spirit of this invention, the essential feature of which consists in heating a mixture of a sulphoacid such as described, or an alkali salt thereof with an alkali or an alkaline earth to effect the formation of the piperazin, their relative proportions being immaterial since they tend only to a greater or less excess of the sulphoacid in the still, the piperazin being formed notwithstanding. It will, however, be found of advantage to effect the reaction under pressure and at higher temperatures when alkaline earths are employed, and when an alkaline earth is used I form a milk of the same by admixture with and suspension in water.

The aforementioned sulphoacids of diphenyl or ditolylpiperazin may be obtained by treating the diphenyl or ditolylpiperazin with fuming sulphuric acid or with sulphuric anhydrid. In this process the formation of the di- tri- and tetra-sulphoacids depends upon the proportion of anhydrid in the sulphuric acid, as well as upon the degree of heat applied and the length of time the mixture is heated, though this is of no special importance in view of the fact that their separation for the formation of piperazin is not necessary.

For the purpose of my invention it will be sufficient to prepare the sulphoacids by combining one part diphenylpiperazin or ditolylpiperazin or their sulphate or hydrochlorate with about four parts of fuming sulphuric acid and heat the mixture for a certain period of time. The piperazin compound, preferably in a finely divided state, may also be subjected to the action of the fumes of sulphuric anhydrid, a strong reaction taking place, at the completion of which, the mixture is treated for a certain time with fuming sulphuric acid. This may be effected in any suitable apparatus, as for instance in a suitably jacketed vessel which may be called the treating vessel, provided with stirring devices and with inlet and exhaust pipes, the sulphuric anhydrid being introduced into a second jacketed vessel, which may be called the still, connected with the treating vessel by a suitable pipe. The still is heated by means of steam, for instance, caused to circulate in the jacket thereof, the fumes or vapors passing over into the treating vessel, the contents of which are kept agitated while the said vessel is kept cool by causing a cooling agent to circulate through its jacket. When the required quantity of sulphuric anhydrid has been distilled over the piperazin compound is discharged into water, and by neutralizing, with soda for instance, the soda salt of the sulphoacid is obtained.

In practice the piperazin compound is preferably mixed with dry sand previously heated or roasted to eliminate impurities therefrom, said sand being separated before neutralization, by filtration.

The quantity of anhydrous sulphuric anhydrid employed relatively to the quantity of piperazin compound will depend upon the proportions or quantity of the sulpho group it is desired to introduce into the piperazin compound. On the other hand, the solution of the sulphoacid of the piperazin compound before neutralization with an alkali or an alkaline earth may be heated with fuming sulphuric acid as above stated.

If it is desired to employ the alkali salts of the sulpho acids, the latter are converted into such salts by saturation in a well-known manner with an alkali.

The piperazin obtained by the above-described processes is used for therapeutic purposes.

Having thus described my invention, what I claim as new therein, and desire to secure by Letters Patent, is—

1. The process of producing piperazin, which consists in mixing an alkali or an alkaline earth with a sulphoacid of diphenyl or ditolylpiperazin, and subjecting the mixture to heat.

2. The process of producing piperazin, which consists in mixing an alkali or alkaline earth with a sulpho acid of a diphenyl or ditolyl piperazin salt of the alkalies and subjecting the mixture to heat.

3. The process of producing piperazin from the sulphoacids of diphenyl or ditolylpiperazin, which consists in forming the sulphoacids by subjecting the diphenyl or ditolyl piperazin or their salts to the action of fuming sulphuric acid, mixing the sulphoacid thus obtained with an alkali or alkaline earth and heating the mixture.

4. The process of producing piperazin from the sulphoacids of diphenyl or ditolylpiperazin, which consists in forming the sulphoacids by subjecting diphenyl or ditolylpiperazin or their salts to the action of fuming sulphuric acid, converting the sulphoacid thus obtained into a salt of the alkalies, combining the said salt with an alkali or alkaline earth and heating the mixture.

5. The process of producing piperazin from the sulphoacids of diphenyl or ditolylpiperazin or their salts, which consists in forming the sulphoacids by subjecting diphenyl or ditolyl piperazin or a salt thereof to the action of the fumes of anhydrous sulphuric acid, treating the sulpho-product with fuming sulphuric acid, mixing therewith an alkali or alkaline earth, and heating the mixture, for the purpose set forth.

6. The process of producing piperazin from the sulphoacids of diphenyl or ditolylpiperazin or their salts, which consists in forming the sulphoacid by subjecting diphenyl or ditolylpiperazin or a salt thereof to the action of the fumes of anhydrous sulphuric acid, treating the sulpho-product with fuming sulphuric acid, converting the sulphoacid thus obtained into a salt of the alkalies, mixing therewith an alkali or alkaline earth, and heating the mixture, for the purpose set forth.

WILHELM MAJERT.

Witnesses:
RICHARD SCHMIDT,
W. HAUPT.